United States Patent [19]

Hodnett, III

[11] Patent Number: 5,114,783

[45] Date of Patent: May 19, 1992

[54] PROTECTIVE COATING SYSTEM FOR IMPARTING RESISTANCE TO ABRASION, IMPACT AND SOLVENTS

[75] Inventor: William P. Hodnett, III, Martinsville, Va.

[73] Assignee: Thor Radiation Research, Inc., Martinsville, Va.

[21] Appl. No.: 235,917

[22] Filed: Aug. 23, 1988

[51] Int. Cl.⁵ .......................... B32B 7/02; B32B 27/00
[52] U.S. Cl. ........................ 428/217; 428/424.2.461; 428/424.4; 428/425.8
[58] Field of Search ............. 428/424.2, 217, 461

[56] References Cited

U.S. PATENT DOCUMENTS

| | | | |
|---|---|---|---|
| 4,079,160 | 3/1978 | Philipson | 428/217 |
| 4,113,895 | 9/1978 | Watt et al. | 427/44 |
| 4,122,225 | 10/1978 | Holmstrom et al. | 428/172 |
| 4,171,387 | 10/1979 | Fogle et al. | 427/54 |
| 4,171,979 | 10/1979 | Novak et al. | 427/44 |
| 4,278,728 | 7/1981 | Honda et al. | 428/313 |
| 4,308,119 | 12/1981 | Russell | 204/159 |
| 4,309,452 | 1/1982 | Sachs | 427/44 |
| 4,319,811 | 3/1982 | Tu et al. | 381/166 |
| 4,326,001 | 4/1982 | Sachs et al. | 428/161 |
| 4,353,980 | 10/1982 | Helling et al. | 430/532 |
| 4,396,650 | 8/1983 | Lange et al. | 427/409 |
| 4,404,247 | 9/1983 | Dominguez-Burguette | 428/213 |
| 4,439,480 | 3/1984 | Sachs et al. | 428/161 |
| 4,469,724 | 9/1984 | Klinger | 427/54 |
| 4,501,767 | 2/1985 | Iimure | 427/44 |
| 4,557,980 | 12/1985 | Hodnett, III | 428/336 |
| 4,618,632 | 10/1986 | Su | 522/43 |
| 4,668,588 | 5/1987 | Kishima | 428/412 |
| 4,675,234 | 6/1987 | Sachs et al. | 428/328 |

OTHER PUBLICATIONS

Patent Abstracts of Japan, vol. 9, No. 71, Mar. 30, 1985; JP-A-59 204 624 dated Nov. 20, 1984 and Derwent Publications Ltd., London, GB WPIL An-85-003912.
Derwent Publications CPI, Week 8922, Jul. 26, 1989; AN-89-163411/22 and JP-A-1 108 038.
Patent Abstracts of Japan, vol. 8, No. 278, Dec. 19, 1984 and JP-A-59 143 985 dates Aug. 17, 1984.

Primary Examiner—George F. Lesmes
Assistant Examiner—Terrel Morris
Attorney, Agent, or Firm—Bell, Seltzer, Park & Gibson

[57] ABSTRACT

This invention relates to a coating system which forms a highly abrasion resistant, chemical resistant, impact resistant protective finish for a substrate. The coating system is based upon using two coatings of different characteristics but having excellent adhesion to one another. The outermost or surface coating layer is a highly crosslinked hard polymer, which is adhered to an underlying base coating layer of a campatible softer polymer. The outer hard polymer preferably comprises a highly crosslinked acrylic polymer, while the underlying softer polymer preferably comprises a crosslinked urethane polymer.

15 Claims, 1 Drawing Sheet

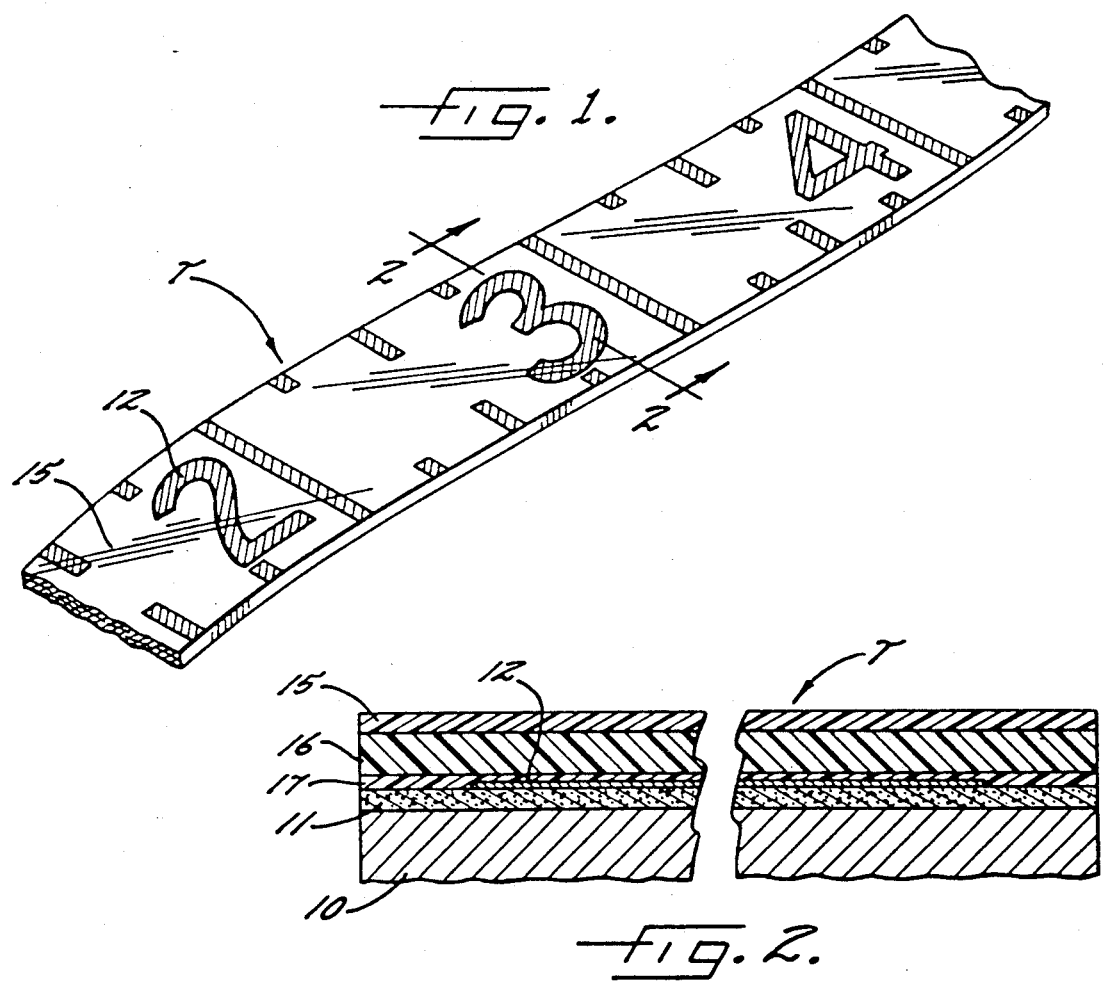

PROTECTIVE COATING SYSTEM FOR IMPARTING RESISTANCE TO ABRASION, IMPACT AND SOLVENTS

BACKGROUND OF THE INVENTION

This invention relates to a coating system which forms a highly abrasion resistant, chemical resistant, impact resistant protective finish for a substrate.

Coating compositions have been developed which, when applied to a substrate and cured, impart a highly abrasion resistant surface to the substrate. Coating compositions of this type have been widely used to impart abrasion resistance to plastic lenses such as eyeglass lenses, to plastic panels and films, to wood surfaces such as furniture, and many other applications where an abrasion resistant or scratch resistant surface finish is of importance.

Abrasion resistant coatings of this type are typically based upon acrylate monomers which are cured or crosslinked after application of the coating, typically by radiation curing. Radiation curable coatings offer the advantage of being rapidly cured and polymerized without requiring curing ovens and they can be applied and processed without having to remove solvents and deal with solvent vapors in the workplace environment.

It is known that radiation cured acrylate polymers can produce very hard (glass hard) protective coatings which exhibit superior abrasion and chemical resistance properties. Although the coatings are quite hard and resistant to abrasion and scratching, they are brittle and have a tendency to crack and peel from the substrate, especially when applied to relatively flexible substrates or when subjected to impact.

Prior abrasion resistant coatings have sought to deal with the brittleness and cracking problem by using a softening comonomer (a monomer with a low second order transition temperature) to impart some degree of flexibility to the coating. However, in achieving increased flexibility and reduced brittleness, the abrasion resistance of the coating is sacrificed. Thus, for example, U.S. Pat. No. 4,319,811 discloses an abrasion resistant radiation curable coating based upon tri- and tetraacrylate monomers, such as pentaerythritol triacrylate with a comonomer such as vinyl pyrrolidone or vinyl caprolactam. U.S. Pat. No. 4,308,119 discloses an abrasion resistant radiation curable coating composition comprised of a pentaerythritol tetraacrylate with a cellulose ester such as cellulose acetate butyrate. U.S. Pat. No. 4,557,980 discloses a radiation curable coating composition based upon a mixture of a triacrylate or tetraacrylate, such as pentaerythritol tetraacrylate, with acrylic acid.

The resistance of a coating to scratching abrasion is typically measured by the rotary steel wool test, which involves subjecting the coating to five revolutions of a pad of 0000 grade steel wool at a defined pressure, usually 12 or 24 psi. The scratching abrasion resistance is rated by measuring the increase in haze from the abrasion. Test methods such as ASTM D-1044 have been developed for optically measuring the resistance of transparent plastic materials to abrasion. Other standard tests for abrasion resistance are the Taber abrasion test described in ASTM D-1004-56.

In many applications, the protective finish needs not only to be "hard" and thus resistant to scratching, but also must have excellent toughness and resistance to impact. The toughness or impact abrasion resistance of a coating is commonly measured by the "falling sand" test (ASTM D968-51). A coating which has good scratch abrasion resistance may not necessarily have good impact abrasion resistance. With the falling sand test, sand is poured onto a coating from a predetermined height, while the thickness of the coating is observed. The results are expressed in terms of the number of liters of sand required to abrade away one tenth of a mil of the coating thickness. The radiation cured abrasion resistance coatings noted in the aforementioned prior patents have a relatively poor resistance to impact abrasion which renders these types of coatings unacceptable for applications requiring both good resistance to scratching abrasion an good resistance to impact abrasion.

With the foregoing in mind, it is an important object of the present invention to provide a coating system which provides not only good resistance to scratching abrasion, but also provides excellent resistance to impact abrasion.

SUMMARY OF THE INVENTION

The present invention provides an abrasion resistant coating system for imparting a highly scratch resistant, chemical resistant and impact resistant protective finish to a substrate. The coating system of the present invention is based upon using two coatings of different characteristics but having excellent adhesion to one another. The outermost or surface coating layer is a highly crosslinked hard polymer, which is adhered to an underlying base coating layer of a compatible softer polymer. The outer hard polymer preferably comprises a highly crosslinked acrylic polymer, while the underlying softer polymer preferably comprises a crosslinked urethane polymer. The outer hard polymer imparts a highly scratch resistant abrasion resistant surface finish, while the underlying base polymer layer exhibits excellent toughness and impact abrasion resistance. The coating system is also highly transparent and non-yellowing so that it effectively serves as a protective coating layer without affecting the color or clarity of the substrate. The outer highly crosslinked hard polymer preferably has a Rockwell hardness of at least 105, and most desirably 115 or greater (Rockwell Hardness "M" scale) while the underlying softer polymer preferably has a Rockwell hardness of no more than about 50, and most desirably about 40 or less (Rockwell Hardness "M" scale). The respective coating layers are preferably cured by exposure to radiation.

More specifically, the outermost hard coating layer may comprise a polymer derived from a multi-functional acrylate monomer of three or more functional groups, most desirably a pentafunctional acrylate monomer. The underlying softer base coating layer may comprise an acrylated urethane polymer derived from a difunctional or multi-functional acrylated urethane resin. The preferred acrylated urethane polymer comprises a copolymer derived from a major proportion of a di- or multi-functional acrylated urethane resin and a minor proportion of a multi-functional acrylated monomer of three or more functional groups. The preferred highly crosslinked hard acrylic polymer of the outer coating layer comprises a polymer derived from a major proportion of a multi-functional acrylate monomer of three or more functional groups and a minor proportion of a monofunctional acrylate.

BRIEF DESCRIPTION OF THE DRAWING

Some of the features and advantages having been stated, others will become apparent from the detailed description which follows, and from the accompanying drawings, in which:

FIG. 1 is a perspective view showing a steel measuring tape which is coated with the protective coating system of the present invention, and FIG. 2 is a cross-sectional view of a portion of the steel tape of FIG. 1, taken substantially along the line 2—2 and illustrating the respective layers of the coating system of the present invention.

DESCRIPTION OF ILLUSTRATIVE EMBODIMENTS

The superior radiation polymerized protective coating system of the present invention may be used advantageously on a wide range of substrates such as wood, glass, rubber, plastics, cellulosic products, metal surfaces such as aluminum, steel, brass, and surfaces with various types of applied coatings such as paints, varnishes, lacquers, and primers. The coating system is especially applicable to various polymeric substrates such as polycarbonate, polystyrene, polyester, diglycol carbonate (e.g. CR-39), either in the form of films, sheets, or shapes. The invention has particular applicability as a protective transparent abrasion resistant coating for painted surfaces such as painted metal surfaces.

FIG. 1 shows a steel measuring tape T having a painted surface which is printed with markings 12 of a contrasting color. The upper surface of the tape T is coated substantially throughout with the protective coating system of the present invention. As shown in more detail in FIG. 2, the steel tape substrate 10 has its front surface coated with a opaque paint coating 11. Indicia markings 12 are printed on the paint coating 11. The coating system comprises a outermost surface layer 15 of a highly crosslinked radiation cured acrylic polymer of very high hardness, which yields scratch and chemical resistance to the surface. The outer layer 15 should preferably have a Rockwell hardness ("M" scale reading) of at least 105, and most desirably 115 or greater. The Rockwell hardness of the coating is typically tested in accordance with the procedures outlined in ASTM Test Method D-785, Procedure A. This coating layer may typically range in thickness from about 0.01 to about 1 mils, and preferably about 0.1 to 0.2 mils in thickness.

The coating composition for the outer layer 15 comprises a multi-functional acrylate monomer of three or more functional groups, which forms at least 40 percent by weight of the composition, and preferably comprises the major constituent of the composition. The coating composition also includes a smaller amount of a monofunctional acrylate monomer.

Suitable multi-functional acrylate monomers are those aliphatic acrylate monomers having from three to six reactive functional groups. The monomer is selected to preferably provide a relatively compact molecular structure with a large number of reactive sites in the least volume. Examples of multi-functional aliphatic acrylate monomers include pentaerythritol triacrylate, pentaerythritol tetraacrylate, trimethylolpropane triacrylate, ethoxylated trimethylolpropane triacrylate, dipentaerthritol monohydroxypentaacrylate, di-trimethylol propane tetraacrylate, trimethylolpropane propoxylate triacrylate, glyceryl propoxylate triacrylate, dipentaerthritol pentaacrylate, and pentaacrylate ester.

Mixed with the multi-functional acrylate monomer is a lesser amount of a small monofunctional monomer of very low viscosity. Examples of suitable small, low viscosity monofunctional monomers include tetrahydrofurfuryl acrylate, cyclohexyl acrylate, isobornyl acrylate, isooctyl acrylate, isodecyl acrylate, n-lauryl acrylate, phenoxyethyl acrylate, 2-methoxyethyl acrylate.

No further monomers, diluents or solvents are required. However, the outer layer may optionally include conventional additives for radiation curable coatings such as fillers and reinforcing agents, dyestuffs, pigments, heat and light stabilizers, photoinitiators, flattening agents and the like. Solvents may be used, if desired, to facilitate control over viscosity and coating thickness.

The underlying softer radiation cured polymer layer 16 is an acrylated urethane which imparts toughness and impact resistance to the coating system. The acrylated urethane layer 16 should preferably have a Rockwell hardness ("M" scale) of no more than about 50 and most desirably about 40 or less. The coating composition for the acrylated urethane layer 16 comprises an acrylated urethane resin which comprises at least 40% by weight of the composition and preferably comprises the major constituent of the composition. The composition also includes a multi-functional acrylate monomer of three or more functional groups, in a lesser amount than the acrylated urethane resin. Preferably, in order to provide excellent compatibility and adhesion between the outer coating layer 15 and the underlying base coating layer 16, the same multi-functional acrylate monomer is used in the base coating layer 16 as is used in the outer coating layer 15. Suitable acrylated urethane resins include di-functional and multi-functional aromatic and aliphatic urethane acrylates such as the commercially available aliphatic urethane diacrylate resins sold by Sartomer Company of West Chester, Pennsylvania, and identified by the Sartomer 9500 and 9600 series products codes. Suitable multi-functional acrylate monomers include those listed above for the outer coating layer. The coating composition may also include conventional additives, fillers and the like, such as those noted above with respect to the outer coating layer.

The base coating layer may be applied directly to the substrate and cured by suitable means, preferably by exposure to ionizing radiation. If an especially high degree of adherence is required, or if the substrate is one which presents difficulty in obtaining good adherence, the substrate may first be coated with a suitable primer layer, and the base coating layer 16 is applied to the primer layer. Thus as shown in the drawing, a primer layer 17 is adhered directly to the paint layer 11 and indicia markings 12.

In a preferred embodiment of the invention, the primer layer itself is a radiation cured polymer layer. The radiation curable composition for the primer layer 17 is selected for its compatibility with the base layer 16, and preferably includes an acrylate monomer of the same or similar molecular structure as that used in the outer layer 15. For many applications it has been found desirable to use the same coating formulation as is used in the outer layer 15, diluted by solvent to permit application of a very thin primer coating layer. Conventional adhesion promoting additives, selected for the particular substrate, can be incorporated in the primer coating composition if desired, as can other types of additives, fillers, photoinitiators, etc. which are conventionally used in radiation curable coatings.

Each respective coating layer is applied individually to the substrate and cured prior to application of the next coating layer. While curing or polymerization of the coatings can be achieved thermally, it is preferred that the coatings be cured by radiation. Polymerization may be initiated by any source of ionizing radiation capable of producing free radicals, including gamma radiation, infrared, microwave, but more typically by electron beam or ultraviolet radiation. Especially suitable is ultraviolet radiation in the 200-400 nm wavelength. When polymerization is by ultraviolet radiation, the coating composition will typically include a photoinitiator compound in accordance with known practices for UV curable compositions.

The respective coating layers are applied to the substrate in a conventional manner such as by roll coating, gravure coating, dipping, spraying, etc. The application methods are conventional and may be selected depending upon the nature of the substrate, desired thickness, and other factors. After application, the coating is radiation polymerized in a known manner. The coating compositions are prepared simply by mixing the appropriate monomers, resins and additives in the desired proportions.

The present invention and its advantages over the prior art will be more fully understood and appreciated from the illustrative and comparative examples which follow. Although specific materials, proportions and procedures are given in these examples, it is to be understood that the examples are for purposes of illustration and are not intended as being limiting upon the scope of the invention. Persons skilled in the applicable arts will appreciate from these examples that this invention can be embodied in many different forms other than as is specifically disclosed.

EXAMPLE 1

This example illustrates the application of the coating system of the present invention to a flexible steel measuring tape of the type used in retractable measuring rules. The steel tape had been suitably primed and its surface was painted a solid background color and thereafter imprinted with measurement markings. A coating composition was prepared consisting of 90 parts by weight monohydroxy dipentaerythritol pentaacrylate (Sartomer 9041), 5 parts tetrahydrofurfuryl acrylate, and 5 parts photoinitiator (1-hydroxycyclohexyl phenyl ketone). This composition was diluted in MEK solvent to 10 percent solids, and was coated onto the surface of the tape by a roll coater to a thickness of about 0.05 mil. The tape was directed under a 3000 watt Fusion Systems Corporation UV curing lamp at 30 feet per minute to cure the primer coating. Then a base coating comprised of 65 parts by weight of acrylated urethane resin (Sartomer 9650), 20 parts pentaacrylate ester (Sartomer 9041), 5 parts tetrahydrofurfuryl acrylate, and 5 parts photoinitiator was applied to the cured primer coating at 75% solids in MEK solvent to a thickness of about 0.5 mil and was cured by exposure to radiation from the UV lamp. Then a 0.2 mil outer coating as applied to the cured base coating. The outer coating was of the same formulation as the primer coating, but was applied at 70% solids in MEK solvent and polymerized by exposure to UV radiation from the UV lamp.

The Rockwell hardness of the two coating compositions was measured using ASTM Test Method D-785, Procedure A. The acrylate outer coating composition has a Rockwell hardness ("M" scale) of 124, and the urethane base coating composition had a Rockwell hardness ("M" scale) of 35.

EXAMPLE 2

The impact abrasion resistance of the coated steel tape prepared in Example 1 was measured by the "falling sand" test (ASTM test method D968-51) and was determined to withstand 60 liters of falling sand. Comparison samples of the same steel tape were prepared using similar procedures as in Example 1, but were coated with only a layer of the acrylate outer coating composition and with only a layer of the acrylated urethane base coating composition. The sample containing only the acrylate top coat layer, while exhibiting good chemical and scratch resistance, withstood only 20 liters of falling sand. The sample coated only with the urethane base coated composition withstood only 45 liters of falling sand and had no scratch resistance.

EXAMPLE 3

A UV curable coating composition was prepared from 65% by weight pentaacrylate ester (Sartomer 9041 from ARCO Specialty Chemicals) 30% tetrahydrofurfuryl acrylate, and 5% photoinitiator. A steel tape similar to that in Example 1 was coated with a 10% solids solution of the coating composition in MEK solvent to a thickness of about 0.1 mil and then directed under a UV lamp as in Example 1. Then a base coating comprised of 65% by weight of acrylated urethane resin (Sartomer 9503), 20% pentaacrylate ester (Sartomer 9041), 10 parts tetrahydrofurfuryl acrylate and 5 parts photoinitiator was applied to the cured primer coating at a thickness of about 0.5 mil and was cured by exposure to radiation from the UV lamp. Then a 0.2 mil outer coating of the pentaacrylate ester/tetrahydrofurfuryl acrylate coating composition (90% solids in THF) was applied to the cured base coating and polymerized by exposure to the UV lamp. The resulting coated tape had a highly scratch resistant, impact resistant transparent coating.

That which is claimed is:

1. An abrasion resistant clear, transparent and non-yellowing coating system for imparting a highly scratch resistant, chemical resistant, impact resistant protective finish to a substrate comprising an outer coating layer of hard radiation cured acrylic copolymer derived from at least 40 percent by weight of a multi-functional acrylate monomer of three to six functional groups and a lesser proportion of a monofunctional acrylate monomer, adhered to a base coating layer of softer radiation cured urethane copolymer derived from at least 40 percent by weight of an acrylated urethane resin and a lesser proportion of said multi-functional acrylate monomer of three to six functional groups.

2. The coating system as defined in claim 1, wherein said multi-functional monomer of three to six functional groups is a pentafunctional acrylate.

3. The coating system as defined in claim 2, wherein said acrylic copolymer is derived from about 65% by weight of said pentafunctional acrylate monomer and abut 30% by weight of said monofunctional acrylate monomer.

4. The coating system as defined in claim 2, wherein said acrylic copolymer is derived from about 90% by weight of said pentafunctional acrylate monomer and about 5% by weight of said monofunctional acrylate monomer.

5. The coating system as defined in claim 1, wherein said urethane copolymer is derived from about 65% by weight of a di-functional or multi-functional acrylated urethane resin and about 20% by weight of said multi-functional acrylate monomer.

6. The coating system as defined in claim 1, wherein said acrylic copolymer is a relatively hard radiation polymerized acrylic copolymer of Rockwell Hardness ("M" scale) of at least 105, and said urethane copolymer is a relatively soft radiation polymerized acrylated urethane polymer of Rockwell Hardness ("M" scale) of no more than 50.

7. The coating system as defined in claim 1 additionally including a primer coating layer of a crosslinked acrylic polymer, and wherein said base coating layer is adhered directly to said primer coating layer.

8. An article of manufacture comprising a substrate and a highly scratch resistant, chemical resistant, impact resistant protective finish on said substrate, said finish comprising an outer coating layer of hard radiation cured acrylic copolymer derived from at least 40 percent by weight of a multi-functional acrylate monomer of three to six functional groups and a lesser proportion of a monofunctional acrylate monomer, adhered to a base coating layer of softer radiation cured urethane copolymer derived from at least 40 percent by weight of an acrylated urethane resin and a lesser proportion of said multi-functional acrylate monomer of three to six functional groups.

9. The article as defined in claim 8, wherein said substrate comprises a painted metal surface having printed indicia thereon, and said outer coating layer and said base coating layer are both transparent so that said printed indicia is visible through the protective finish.

10. The coating system as defined in claim 8, wherein said acrylic copolymer is a relatively hard radiation polymerized acrylic polymer of Rockwell Hardness ("M" scale of at least 105, and said urethane copolymer is a relatively soft radiation polymerized urethane polymer of Rockwell Hardness ("M" scale) of no more than 50.

11. The coating system as defined in claim 8, wherein said multi-functional acrylate monomer of three to six functional groups is a pentafunctional acrylate.

12. The coating system as defined in claim 11, wherein said acrylic copolymer is derived from about 65% by weight of said pentafunctional acrylate monomer and about 30% by weight of said monofunctional acrylate monomer.

13. The coating system as defined in claim 11, wherein said acrylic copolymer is derived from about 90% by weight of said pentafunctional acrylate monomer and about 5% by weight of said monofunctional acrylate monomer.

14. The coating system as defined in claim 8, wherein said urethane copolymer is derived from about 65% by weigh of a di-functional or multi-functional acrylated urethane resin and about 20% by weight of said multi-functional acrylate monomer.

15. The coating system as defined in claim 8, additionally including a primer coating layer of a crosslinked acrylic copolymer, and wherein said base coating layer is adhered directly to said primer coating layer.

* * * * *

UNITED STATES PATENT AND TRADEMARK OFFICE
CERTIFICATE OF CORRECTION

PATENT NO. : 5,114,783
DATED : May 19, 1992
INVENTOR(S) : Hodnett, III

It is certified that error appears in the above-identified patent and that said Letters Patent is hereby corrected as shown below:

Column 2, line 14, please change "an" to --and--.

Column 4, line 41, please change "Sartomerv" to --Sartomer--

Column 6, line 65, please change "abut" to --about--

Signed and Sealed this

Fifth Day of April, 1994

Attest:

BRUCE LEHMAN

Attesting Officer   Commissioner of Patents and Trademarks